United States Patent
Ikura et al.

(10) Patent No.: US 6,973,798 B2
(45) Date of Patent: Dec. 13, 2005

(54) AIR CONDITIONING SYSTEM FOR VEHICLE

(75) Inventors: Hiroshi Ikura, Saitama (JP);
Hiromitsu Adachi, Saitama (JP);
Masamichi Kubota, Saitama (JP);
Hideki Watanabe, Saitama (JP);
Shinichirou Wakou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/864,421

(22) Filed: Jun. 10, 2004

(65) Prior Publication Data

US 2004/0250560 A1 Dec. 16, 2004

(30) Foreign Application Priority Data

Jun. 12, 2003 (JP) .............................. 2003-167347

(51) Int. Cl.[7] ............................................ F25B 49/02
(52) U.S. Cl. ...................... 62/228.5; 62/236; 62/323.3; 417/5; 417/429
(58) Field of Search ........................... 62/196.2, 228.5, 62/236, 323.3; 417/3, 5, 374, 429

(56) References Cited

U.S. PATENT DOCUMENTS

| | | | |
|---|---|---|---|
| 3,668,886 A | * | 6/1972 | Ruff et al. ..................... 62/158 |
| 4,543,044 A | * | 9/1985 | Simmons ..................... 417/342 |
| 4,934,158 A | * | 6/1990 | Sakano .......................... 62/239 |
| 5,029,449 A | * | 7/1991 | Wilkinson .................... 62/175 |
| 5,062,274 A | * | 11/1991 | Shaw ........................... 62/117 |
| 5,927,088 A | * | 7/1999 | Shaw ........................... 62/175 |
| 6,266,952 B1 | * | 7/2001 | Choroszylow et al. ........ 60/783 |
| 6,287,081 B1 | * | 9/2001 | Tamegai et al. .............. 417/15 |
| 6,543,243 B2 | * | 4/2003 | Mohrmann et al. ........... 62/230 |
| 6,659,727 B2 | * | 12/2003 | Major et al. .................. 417/16 |

FOREIGN PATENT DOCUMENTS

JP  2000-179374  6/2000

* cited by examiner

*Primary Examiner*—William E. Tapolcai
(74) *Attorney, Agent, or Firm*—Arent Fox PLLC

(57) ABSTRACT

An air conditioning system 1 includes a primary compressor (an engine-driven compressor 6) driven by a primary driving source (an engine 2) and a secondary compressor (a motor-driven compressor 7) driven by a secondary driving source (a motor 3). When a required cooling capability is equal to or greater than a predetermined value, the air conditioning system 1 causes the primary compressor (the engine-driven compressor 6) to be driven by the primary driving source (the engine 2) and adjusts the rotational speed of the secondary compressor (the motor-driven compressor 7), whereas when the required cooling capability is equal to or smaller than the predetermined value, the air conditioning system 1 causes the secondary compressor (the motor-driven compressor 7) to be driven by the secondary driving source (the motor 3) so as to control the rotational speed of the primary compressor (the engine-driven compressor 6).

2 Claims, 6 Drawing Sheets

AIR CONDITIONING SYSTEM FOR VEHICLE

BACKGROUND OF THE INVENTION

The present invention relates to an air conditioning system for a vehicle including a primary compressor which is driven by a primary driving source including an engine and a secondary compressor driven by a secondary driving source including a motor.

Conventionally, there are known air conditioning systems for vehicle (hereinafter, referred simply to an "air conditioning system") which use an engine driven compressor which uses a vehicular running engine as a driving source, an electric motor which is installed in an electric vehicle and a motor driven compressor which is used when the idling of an engine is stopped.

In recent years, there is an increasing tendency to drastically promote the conservation of environment and improvement in fuel economy, and in conjunction with this tendency, the number of vehicles having a stop-idling function tends to increase. In a vehicle having such a stop-idling function, when the vehicle is stopped while an air conditioning system is in use, the stop-idling function operates to stop the idling of the engine, and a compressor cannot operate in association with the stop of the engine. As a result, when the outside temperature is high or the sunlight is intense, the temperature of a passenger compartment of the vehicle increases, whereby there may occur a case where occupants feel uncomfortable. On the contrary, when the outside temperature is low, the dehumidifying capability is lowered to be short, and breath expelled from the occupants increases the humidity inside the passenger compartment, causing an inconvenient condition where windows are fogged.

Then, there is proposed an air conditioning system (for example, a patent literature No. 1) in which the engine is driven temporarily according to the temperature inside the passenger compartment to activate the compressor so as to adjust the temperature inside the passenger compartment to an appropriate level, and thereafter, the idling of the engine is stopped again.

In addition, in so-called mild hybrid vehicles, an air conditioning system is used in which a compressor is driven by an electric motor after the rotational speed of an engine becomes zero.

[Patent Literature No. 1]

JP-A-2000-179374 (pages 4 to 5, and FIGS. 3 and 5)

In these conventional air conditioning systems, however, even if the compressor is activated, a required cooling capability cannot be provided by the air conditioning system immediately after the activation of the system. As a result, the air conditioning is carried out only by a blower until the required cooling capability is provided by the air conditioning system. Consequently, since the temperature within the passenger compartment increases until then, there is caused a problem that the uncomfortableness cannot be eliminated within the passenger compartment.

SUMMARY OF THE INVENTION

An object of the invention is to provide an air conditioning system for a vehicle which can accomplish both the increase in the cooling capability of an air conditioning system and the improvement in the fuel economy of an engine by making better the efficiency of compressors.

With a view to attaining the object, according to a first aspect of the invention, there is provided an air conditioning system for a vehicle including a primary compressor driven by a primary driving source and a secondary compress or driven by a secondary driving source, wherein when a required cooling capability is equal to or greater than a predetermined value, the air conditioning system causes the primary compressor to be driven by the primary driving source and adjusts the rotational speed of the secondary compressor, whereas when the required cooling capability is equal to or smaller than the predetermined value, the air conditioning system causes the secondary compressor to be driven by the secondary drive source so as to control the rotational speed of the primary compressor.

According to the first aspect of the invention, when the required cooling capability is equal to or greater than the predetermined value, the air conditioning system causes the primary compressor (an engine-driven compressor) to be driven by the primary driving source (an engine), whereby the rotational speed of the secondary compressor (a motor-driven compressor) that is driven by the secondary driving source (a motor) is adjusted.

On the other hand, when the required cooling capability is equal to or smaller than the predetermined value, the air conditioning system causes, for example, the secondary compressor (the motor-driven-compressor) that is driven by the secondary driving source (the motor) to be so driven so as to control the rotational speed of the primary compressor (the engine-driven compressor).

Thus, since the air conditioning system changes over the two compressors to make them play a role as a main compressor by making the compressors operate simultaneously or independently according to the required cooling capability, not only can the efficiency of the compressor be increased but also contradicting requirements of increasing the cooling capability of the air conditioning system and improving the fuel economy of the engine can be satisfied simultaneously.

Due to this, for example, even when the primary compressor (the engine-driven compressor) is stopped as a result of stopping the idling of the primary driving source (the engine), the decrease in the cooling capability of the air conditioning system can be prevented by the action of the secondary compressor (the motor-driven compressor) only to thereby prevent an increase in temperature inside the passenger compartment. By this construction, the air conditioning system can maintain the temperature of cooled air thereof that is discharged into the passenger compartment to thereby maintain the inside of the passenger compartment at a comfortable temperature.

According to a second aspect of the invention, there is provided an air conditioning system for a vehicle as set forth in the first aspect of the invention, wherein when stopping the primary compressor, the air conditioning system causes a timer to stop the primary compressor a predetermined length of time after a stopping signal is received.

According to the second aspect of the invention, when stopping, for example, the primary compressor (the engine-driven compressor), the air conditioning system causes the timer to stop the primary compressor (the engine-driven compressor) the predetermined length of time after the stopping signal is received, whereby the primary compressor (the engine-driven compressor) can be stopped after an extra cooling capability is imparted to the air conditioning system. By this construction, for example, even when the primary compressor (the engine-driven compressor) is stopped as a result of stopping the idling of the engine, the air conditioning system can maintain the inside of the passenger compartment at a comfortable temperature in the event that the air conditioning system is run by the secondary compressor (the motor-driven compressor) only.

BRIEF DESCRIPTION OF THE DRAWINGS

FIG. 3 showing the air conditioning system according to the embodiment of the invention, in which

FIG. 5 shows the air conditioning system according to the embodiment of the invention, in which

DETAILED DESCRIPTION OF THE PREFERRED EMBODIMENTS

An embodiment of an air conditioning system for a vehicle according to the invention will be described in detail below by reference to the accompanying drawings.

Figure 1:
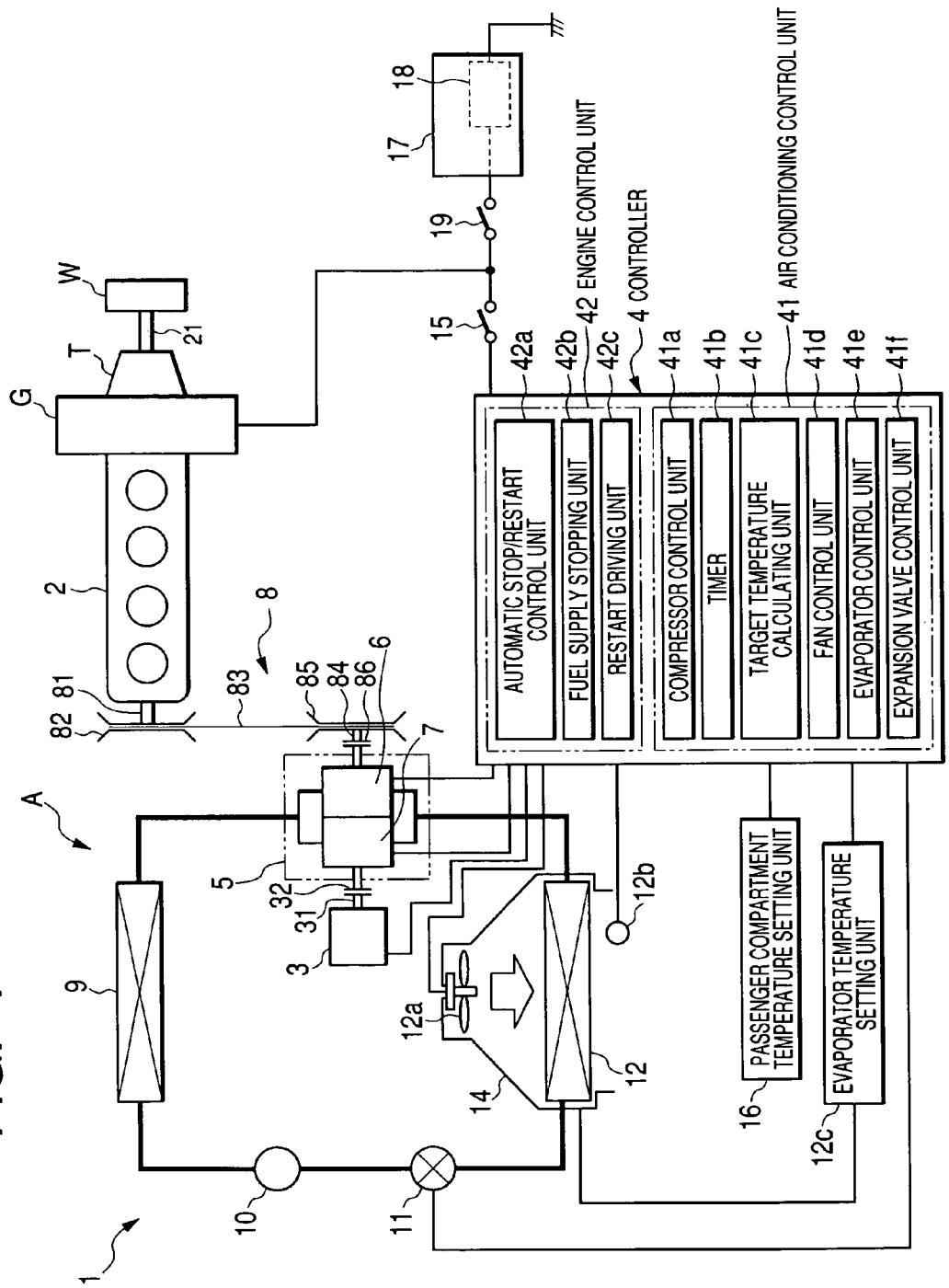
FIG. 1 is a block diagram showing an air conditioning system for a vehicle according to an embodiment of the invention.

FIG. 1 is a block diagram showing an air conditioning system for a vehicle according an embodiment of the invention.

As shown in FIG. 1, an air conditioning system 1 for a vehicle is such as to operate based on, as driving sources, an engine 2 which is a driving source of a vehicle and a motor 3 for a motor-driven compressor 7.

While the air conditioning system 1 is optimum as a system that is installed in , for example, a vehicle provided with a stop-idling function (an automatic stop and restart function), the system may be installed either in the vehicle having such a function or in a vehicle having no such function.

Hereinafter, an embodiment of the invention will be described by taking as an example an air conditioning system 1 on a vehicle in which the stop-idling function is installed.

The vehicle is, for example, a hybrid vehicle which runs on, as driving sources, an engine 2 and a motor/generator G which are shown in FIG. 1, and the hybrid vehicle is equipped with a stop-idling function for automatically stopping and restarting the engine 2 in order to reduce the amount of exhaust emissions when the vehicle is stopped temporarily at a traffic signal or is forced to be stopped temporarily in a traffic jam.

When running on the engine 1, the vehicle has a mode in which the vehicle runs only on the engine 2 with a running motor (not shown) of the motor/generator G being not driven and a mode in which part of the power of the engine is used to charge a generator (not shown) of the motor/generator G. The mode for charging the motor/generator G has a mode where the generator is charged using the power from the engine 2 and, for example, a mode (a deceleration regenerating mode) where vehicle energy is used for charging by allowing the motor/generator G to be rotated by virtue of driving force of wheels in a state where no fuel is injected into the engine 2 at the time of deceleration of the vehicle (a fuel-cut state). Then, in the vehicle, when running solely on the running motor of the motor/generator G, the vehicle runs in a state where an energy loss (a pumping loss) is decreased which results when cylinders of the engine 2 move with intake and exhaust valves thereof being closed.

In addition, the vehicle is equipped with the air conditioning system 1 for heating and cooling air inside a passenger compartment thereof. The vehicle may be a bus, truck, working vehicle or passenger vehicle, and there is imposed no specific limitation on the structure of the vehicle.

As shown in FIG. 1, the air conditioning system 1 includes a hybrid-type compressor 5 for operating a refrigeration cycle apparatus A which includes, in turn, an engine-driven compressor 6 and a motor-driven compressor 7, a condenser 9, a liquid refrigerant receiver 10, an expansion valve 11, an evaporator 12 having an air temperature sensor 12b and a controller 4.

Next, the respective devices will be described by reference to FIG. 1.

As shown in FIG. 1, the engine 2 is, for example, an internal combustion engine using gasoline as a fuel for running a vehicle and functions to rotate wheels W, to rotate the motor/generator G to store electrical energy in an electrical energy storage unit 17 and to drive the engine-driven compressor 6. The engine 2 and the motor/generator G are connected to each other via a rotating shaft 21 so as to form a hybrid-type driving source. This construction enables the generation of driving force by the engine 2 and the motor/generator G and storage of energy from the wheels at the time of deceleration through the rotation of the motor/generator G. A transmission device 8 is provided on the other end of the engine 2 for allowing the engine-driven compressor 6 and the engine 2 to interlock. The rotation of the engine 2 is transmitted to the wheels W via a transmission T.

Note that the engine 2 and the motor/generator G correspond to a "primary driving source" claimed herein.

The transmission device 8 is constituted by a belt transmission mechanism constructed by extending a belt 83 between a pulley 82 provided on the engine 2 and a pulley 85 provided on the engine-driven compressor 6. The transmission device 8 includes, for example, a rotating shaft 81 disposed on the other end of the engine 2 so as to be rotated by the engine 2, the pulley 82 provided at a distal end of the rotating shaft 81, the pulley 85 for driving the engine-driven compressor 6, the belt 83 for making the pulley 82 and the pulley 85 to interlock, and a driving shaft 84 provided on the engine-driven compressor 6.

The motor/generator G has a function as a starter motor for starting the engine 2 and a function to generate electricity by being rotated by the engine 2 or the driving force from the wheels. The motor/generator G is electrically connected to the electrical energy storage unit 17 for charging a battery 18 and supplying power for respective electric equipment.

A motor 3 is a power source which is electrically connected to the battery 18 via an air conditioner switch 15 and an ignition switch 19 and is rotated by the battery 18 so as to drive the motor-driven compressor 7. The rotation of the motor 3 is designed to intermittently be transmitted to the motor-driven compressor 7 by a rotating shaft 31 having an electromagnetic clutch 32 interposed at an intermediate portion thereof.

Note that the motor 3 corresponds to a "secondary driving source" claimed herein.

A refrigeration cycle apparatus A is such as to form a refrigeration cycle in the air conditioning system 1. The refrigeration cycle apparatus A includes, as main constituent parts, a hybrid-type compressor 5, a condenser 9, a liquid refrigerant receiver 10, an expansion valve 11 and an evaporator 12, and these constituent parts are connected sequentially in that order with the hybrid-type compressor 5 being located at a most-upstream end and the evaporator 12 being located at a most-downstream end. The refrigeration cycle is a cycle of refrigerant including evaporation, compression, condensation and expansion, and the evaporator 12 performs evaporation, the hybrid-type compressor 5 performs compression, the condenser 9 performs condensation, and the expansion valve 12 performs expansion.

The hybrid-type compressor 5 is a device for compressing a refrigerant constituted by fluorocarbon gas (HFC134a) or carbon dioxide ($CO_2$) gas. The hybrid-type compressor 5 is constituted by two compressor; the engine-driven compressor 6 that uses an engine-driven method in which the compressor is driven by the engine 2 and the motor-driven compressor 7 that uses an electrically driven method the compressor is driven by the motor 3, for the sake of saving the power of the compressor. Being constituted by the two types of compressors, the hybrid-type compressor 5 operates to save the power, to provide a comfortable environment within the passenger compartment and to improve the fuel economy of the engine 2. A refrigerant compressed by the hybrid-type compressor 5 is fed with pressure to a condenser 9 via piping. The hybrid-type compressor 5 is electrically connected to a compressor control unit 41a of a controller 41 to thereby be so controlled.

Note that the hybrid-type compressor 5 may be an integral-type compressor constituted by the engine-driven compressor 6 and the motor-driven compressor 7 or include those compressors which are made separate from each other.

The engine-driven compressor 6 includes, for example, a compressor which is driven through transmission of the rotation of the rotating shaft 81 of the engine 2 via the transmission device 8. The engine-driven compressor 6 includes a compressor having a capacity which is larger than that of the motor-driven compressor 7. Under an environment where cooling is required, of the two compressors, the engine-driven compressor 6 mainly operates so as to control the temperature of air downstream of the evaporator 12 (hereinafter, referred simply to as an "evaporator temperature" (EVA)) to a target evaporator temperature (TGTAC). The engine-driven compressor 6 is controlled to be operated by the compressor control unit 41a based on a difference between a target evaporator temperature (TGTAC) calculated by a target temperature calculating unit 41c based on a set passenger compartment temperature that is set by a passenger compartment temperature setting unit 16 and environmental factors such as humidity and amount of sunlight and the evaporator temperature (EVA) of air detected by an air temperature sensor 12b of the evaporator. The electromagnetic clutch 86 is placed at the intermediate location of the driving shaft 84 provided on the engine-driven compressor 6 for intermittent transmission of the rotation of the engine 2. The engine-driven compressor 6 is electrically connected to the compressor control unit 41a.

Note that the engine-driven compressor 6 corresponds to a "primary compressor" claimed herein.

The motor-driven compressor 7 is an electric compressor which is connected to the motor 3 by the rotating shaft 31 via an electromagnetic clutch 32 so as to be rotated by the motor 3 which functions as an auxiliary to the engine-driven compressor 6. The motor-driven compressor 7 operates together with the engine-driven compressor 6 which is driven by the engine 2, operates when the idling of the engine 2 is being stopped or operates irrespective of the sole operation of the engine-driven compressor 6. Under an environment where a low load or heating while dehumidifying is required, of the two compressors, the motor-driven compressor 7 mainly operates to control the evaporator temperature (EVA) to the target evaporator temperature (TGTAC). The motor-driven compressor 7 is controlled to operate by the compressor control unit 41 based on a difference between the set passenger compartment temperature, the target evaporator temperature (TGTAC) and the evaporator temperature (EVA).

Thus, while the rotation of the motor-driven compressor 7 is controlled by the temperature of air on a downstream side of the evaporator 12 (hereinafter, referred simply to an "outlet side of the evaporator 12") through which air cooled by the evaporator 12 flows and the target evaporator temperature (TGTAC), when the engine 2 is operating, the target evaporator temperature (TGTAC) is designed to be raised by in the order of 2 to 3° C.

Note that the motor-driven compressor 7 corresponds to a "secondary compressor" claimed herein.

The condenser 9 is a device for cooling and liquifying the refrigerant whose pressure and temperature are raised by the hybrid-type compressor 5. The condenser 9 is connected to the liquid refrigerant receiver 10 via piping.

The liquid refrigerant receiver 10 is a device corresponding to a cylinder for temporarily storing a refrigerant that is liquified by the condenser 9. The liquid refrigerant receiver 10 is connected to the expansion valve 11 via a dryer (not shown), and water contents in the refrigerant are dehydrated by the dryer so that the resulting refrigerant is supplied to the expansion valve 11.

The expansion valve 11 is a device that is attached to an inlet of the evaporator 12 for converting the high-temperature and high-pressure liquified refrigerant into atomized gas when the refrigerant passes therethrough for injection. The expansion valve 11 is connected to the evaporator 12 via piping and is also connected to the controller 4 electrically. A throttle valve (not shown) is installed in the expansion valve 11 and is controlled by the controller 4 based on a detected value by the air temperature sensor 12b that is installed in the evaporator 12 so as to regulate the flow rate of the refrigerant (the cooling capability) that is injected into the evaporator 12.

The evaporator 12 is a heat exchanger for removing heat from air inside the passenger compartment by gasifying the refrigerant and is installed in an air conditioner case 14. A fan 12a is provided on the evaporator 12 for sending cooled air into the passenger compartment for circulation by drawing in air inside the passenger compartment whose temperature is increased by direct sunlight and the temperature of outside air. The evaporator 12 is connected to the hybrid-type compressor 5 via piping in such a manner that the refrigerant whose pressure is regulated via valves (not shown) is returned to the hybrid-type compressor 5 where the refrigerant originates. The temperature of the refrigerant in the evaporator 12 is controlled by an evaporator temperature setting unit 12c and an evaporator control unit 41e. The evaporator 12 is electrically connected to the air conditioning control unit 41 via the temperature setting unit 12c of the evaporator 12.

The fan 12a is a device that is placed on the outlet side of the evaporator 12 for drawing in air inside the passenger compartment to cause the air so drawn in to strike the evaporator 12 and returning the air so cooled by the evaporator 12 into the passenger compartment from defroster outlets (not shown), face outlets (not shown) and foot outlets (not shown) via various types of ducts (not shown) for circulating air inside the passenger compartment. The fan 12a is electrically connected to a fan control unit 41d of the controller 4. The rotation of the fan 12a is controlled by the fan control unit 41d, whereby the amount of air to be sent out by the fan 12a is controlled.

The air temperature sensor 12b of the evaporator 12 is a temperature detector for detecting the temperature of aid cooled by gasifying the refrigerant by the evaporator 12 and is installed in the air conditioner case 14 on an outlet side of air that flows through the evaporator 12.

The evaporator temperature setting unite includes an evaporator temperature setting control unit (not shown) for controlling individually the engine-driven compressor 6 and the motor-driven compressor 7 and an evaporator temperature setting control unit (not shown) for the engine-driven compressor for controlling the engine-driven compressor 6 in accordance with the control of the motor-driven compressor 7.

The passenger compartment temperature setting unit 16 is designed to be used by an occupant when setting the temperature inside the passenger compartment to an appropriate level and includes a controller (a control panel) provided at a central portion on an instrument panel. The passenger compartment temperature setting unit 16 is electrically connected to the controller 4.

The controller 4 is an ECU having installed therein electric and electronic circuits and predetermined programs and includes the air conditioning control unit 41, an engine control unit 42 for controlling the engine 2, a control unit for changing over the charging and discharging of the electrical energy storage unit 17, and a control unit (not shown) for other constituent devices.

Next, referring to FIGS. 1 and 2, the air conditioning control unit 41 will be described.

Figure 2:
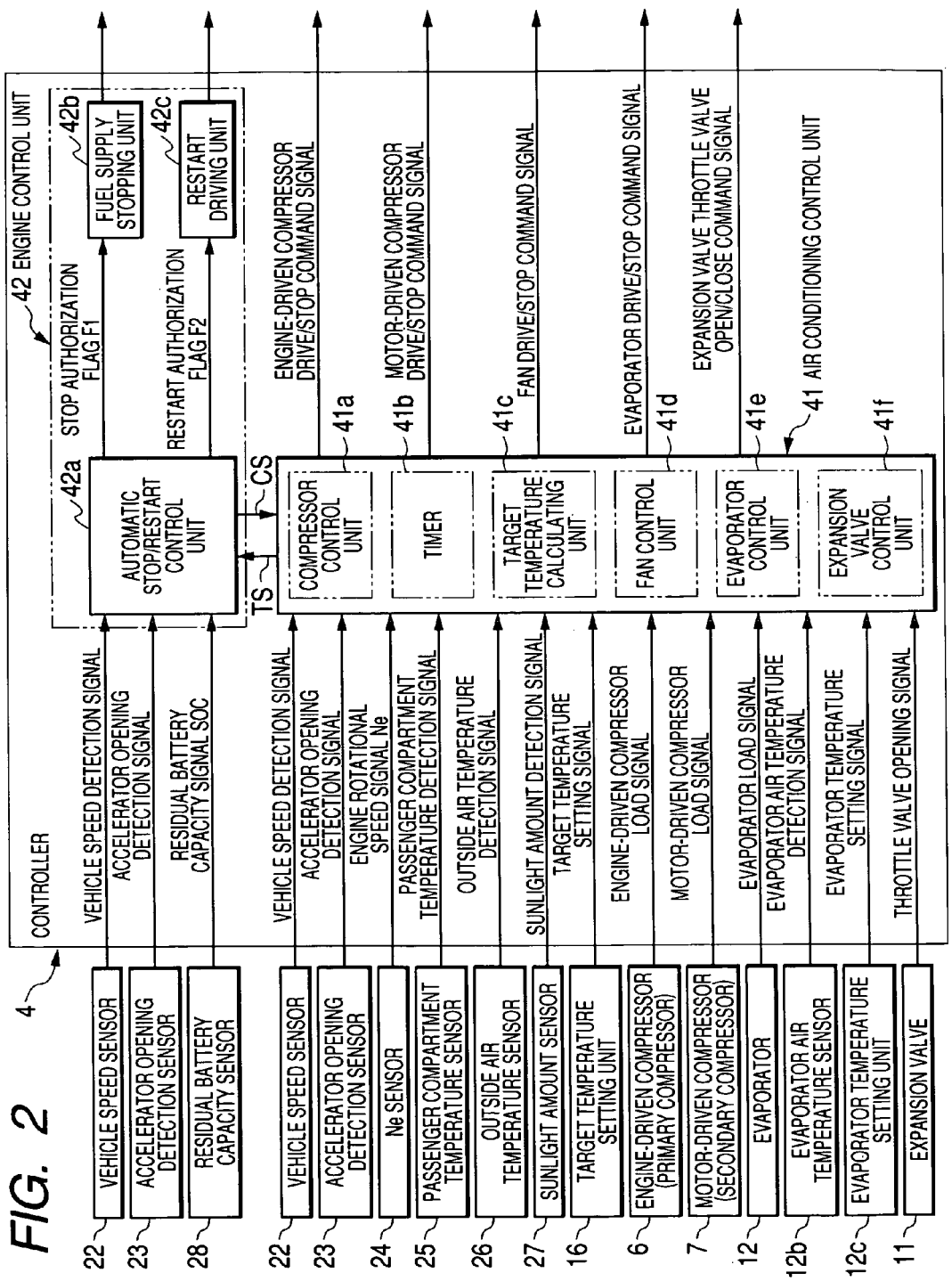
FIG. 2 is a block diagram showing the configuration of a controller that is used in an air conditioning system shown in FIG. 1.

FIG. 2 is a block diagram showing the configuration of the controller for use in the air conditioning system shown in FIG. 1.

As shown in FIG. 1, the air conditioning control unit 41 is such as to control the operations of the engine-driven compressor 6, the motor-driven compressor 7, the expansion valve 11, the evaporator 12 and the fan 12a and includes the compressor control unit 41a, a timer 41b, the target temperature setting unit 41c, the fan control unit 41d, the evaporator control unit 41e and an expansion valve control unit 41f.

Then, the air conditioning control unit 41 has the following functions.

First of all, the air conditioning control unit 41 has a function to compare an evaporator temperature (EVA) detected by the air temperature sensor 12b of the evaporator with a target evaporator temperature (TGTAC) calculated by the target temperature calculating unit 41c to decrease the output of the motor 3 for driving the motor-driven compressor 7 when the evaporator temperature (EVA) is lower than the target evaporator temperature (TGTAC).

The air conditioning system 1 has a function to increase the cooling capability by the motor-driven compressor 7 by increasing in advance the output thereof before the engine-driven compressor 6 is stopped.

When stopping the engine-driven compressor 6, the air conditioning system 1 has a function to assist in securing a required output of the motor-driven compressor 7 by activating the engine-driven compressor 6 when the output of the motor-driven compressor 7 required needs to become equal to greater than a predetermined value.

In addition, when stopping the engine-driven compressor 6, the air conditioning system 1 has a function to assist in securing a required output of the motor-driven compressor 7 by arranging for the engine-driven compressor 6 to be stopped a predetermined length of time so as to allow the engine-driven compressor 6 to continue to operate for the predetermined length of time when the output of the motor-driven compressor 7 required needs to become equal to greater than the predetermined value.

Furthermore, the air conditioning system 1 has a function to cause the engine-driven compressor 6 to assist in securing a required output of the motor-driven compressor 7 by activating the engine-driven compressor 6 when the load of the motor-driven compressor 7 required needs to become equal to or greater than a predetermined value during the operation thereof.

As shown in FIG. 2, connected to the air conditioning control unit 41 are a vehicle speed sensor 22 for outputting a vehicle speed detection signal, an accelerator opening detection sensor 23 for outputting an accelerator opening detection signal, an engine rotational speed sensor (Ne sensor) 24 for detecting the rotational speed of the engine 2 (refer to FIG. 1) to output an engine rotational speed detection signal Ne, a passenger compartment temperature sensor 25 for detecting the temperature of the passenger compartment to output a passenger compartment temperature detection signal, an outside air temperature sensor 26 for detecting a temperature outside the passenger compartment to output an outside air temperature detection signal, a sunlight amount sensor 27 for detecting an amount of sunlight received from the sun to output a sunlight amount detection signal, the passenger compartment temperature setting unit 16 for outputting a target temperature setting signal for a set passenger compartment temperature set by an occupant which constitutes a reference to a target evaporator temperature (TGTAC), the engine-driven compressor 6 which outputs an engine-driven compressor load signal, the motor-driven compressor 7 which outputs a motor-driven compressor load signal, the evaporator 12 which outputs an evaporator load signal, an evaporator air temperature sensor 12b for detecting the temperature of air that is cooled by the evaporator 12 to output an evaporator air temperature detection signal, the evaporator temperature setting unit 12c for outputting an evaporator temperature setting signal for controlling the engine-driven compressor 6 and the motor-driven compressor 7, and the expansion valve 11 for outputting a throttle valve opening signal.

Note that the engine-driven compressor load signal and the motor-driven compressor load signal are, for example, a rotational speed command value.

As shown in FIG. 1, the air conditioning unit 41 is intended to operate the refrigeration cycle apparatus A, for example only the engine 2 is driven, and is configured so as to output a command signal for activating the engine-driven compressor 6. The electromagnetic clutch 86 is engaged by a drive command signal for driving the engine-driven compressor 6, whereby the engine-driven compressor 6 operates.

In addition, the air conditioning control unit 41 outputs a drive command signal for driving the motor-driven compressor 7 while the engine 2 is automatically stopped (the idling of the engine 2 is being stopped).

The air conditioning control unit 41 allow the engine 2 to continue to drive the engine-driven compressor 6 before the idling of the engine 2 is stopped and outputs a motor-driven compressor 7 drive command signal so as to allow the motor-driven compressor 7 to be operated.

Then, the air conditioning control unit 41 has a function to calculate and estimate a timing at which the motor-driven compressor 7 is activated based on a vehicle speed signal, an accelerator opening detection signal and an engine rotational speed signal Ne.

Then, when the idling of the engine 2 is stopped, the air conditioning control unit 41 outputs an engine-driven compressor 6 stop command signal or an engine-driven compressor 6 drive command signal depending on the loaded condition of the motor-driven compressor 7. When the electromagnetic clutch 86 is disengaged by the engine-driven compressor 6 stop command signal, the engine-driven compressor 6 stops and only the motor-driven compressor 7 is allowed to operate.

Then, in automatically restarting the engine 2, the air conditioning unit 41 output an engine-driven compressor 6 drive command signal at the same time that the engine 2 is driven by the motor/generator G so that the engine-driven compressor 6 can start to operate. Then, when an automatic stop/restart control unit 42*a* makes the motor/generator G drive the engine 2, the air conditioning control unit 41 makes the engine-driven compressor 6 and the motor-driven compressor 7 operate together.

The compressor control unit 41*a* is a controller for controlling the engine-driven compressor 6 and the motor-driven compressor 7 of the hybrid-type compressor 5 so that the temperature of the passenger compartment becomes a target evaporator temperature (TGTAC) calculated by the target temperature calculating unit 41*c*.

The timer 41*b* is such as to measure a predetermined length of time that is to elapse from the receipt of an engine-driven compressor 6 stop signal until the halt of the engine-driven compressor 6.

The target temperature calculating unit 41*c* is such as to calculate a temperature on the outlet side of the evaporator 12 such that the temperature of the passenger compartment becomes equal to a set temperature that is set at the passenger compartment temperature setting unit 16 by an occupant based on predetermined disturbance conditions such as outside temperature and amount of sunlight that are preset. A value that is calculated by the target temperature calculating unit 41*c* is altered to a suitable value according to the outside temperature and amount of sunlight.

The fan control unit 41*d* is a controller for circulating cooled air cooled by the evaporator 12 in the passenger compartment by operating the fan 12*a* and controlling the rotational speed of the fan 12*a* so that the air temperature of the evaporator 12 detected by the evaporator air temperature sensor 12*b* becomes suitably the target evaporator temperature (TGTAC) calculated by the target temperature calculating unit 41*c*. Note that the fan 12*a* may be constructed so as to be turned on and off manually.

The evaporator control unit 41*e* is such as to control the motor-driven compressor 7 and the engine-driven compressor 6 based on an evaporator temperature setting signal from the evaporator temperature setting unit 12*c*.

The expansion valve control unit 41*f* is a controller for controlling the flow of refrigerant by regulating the opening of the throttle valve (not shown) installed in the expansion valve 11.

Next, referring to FIGS. 1 and 2, the engine control unit 42 will be described.

As shown in FIG. 1, the engine control unit 42 includes the automatic stop/restart control unit 42*a* for determining whether or not the idling of the engine 2 is stopped by stopping the idling of the engine 2 or automatically restarting the engine 2, a fuel supply stopping unit 42*b* for stopping the supply of fuel to the engine 2 based on a signal from the automatic stop/restart control unit 42*a* so as to stop the idling of the engine 2 and a restart driving unit 42*c* for restarting the engine 2 which is being stopped from idling.

The automatic stop/restart control unit 42*a* is such as to stop the idling of the engine 2 by sending signals to stop the supply of fuel to the engine 2 and to implement the supply of fuel to the engine 2 to the fuel supply stopping unit 42*b* and the restart driving unit 42*c* and to mainly change over the charging and discharging of the battery 18.

As shown in FIG. 2, the automatic stop/restart control unit 42*a* is electrically connected to the vehicle speed sensor 22, the accelerator opening detection sensor 23, and a residual battery capacity sensor 28 for detecting the amount of electric energy remaining in the battery 18 (refer to FIG. 1) and outputting a residual battery capacity signal (Status of Charge) based on the amount of electric energy so detected. In addition, the fuel supply stopping unit 42*b* and the restart driving unit 42*c* are electrically connected to the automatic stop/restart control unit 42*a*.

The automatic stop/restart control unit 42*a* outputs a stop authorization flag F1 towards the fuel supply stop unit 42*b* after elapse of preset timer time after receiving from the accelerator opening detection sensor 23 an accelerator opening detection signal that informs of the closure of an accelerator on the assumption that predetermined conditions are met which will be described later on. Then, the fuel supply stopping unit 42*b* which has received the stop authorization flag F1 stops the supply of fuel to the engine 2 (refer to FIG. 1) to thereby stop the engine 2 (refer to FIG. 1). In addition, the automatic stop/restart control unit 42*a* outputs an engine stop signal CS towards the air conditioning control unit 41 when the engine (refer to FIG. 1) is stopped.

The predetermined conditions, that is, the conditions for stopping the idling of the engine 2 shown in FIG. 1 include at least such factors as: the vehicle speed becomes a low vehicle speed that is equal to or slower than a preset reference vehicle speed; a brake switch is switched on; the temperature of coolant in the engine 2 is equal to or higher than a predetermined value; the gearshift position of the vehicle is in a predetermined position other than R (reverse) or L (low); and the residual battery capacity is equal to or greater than a predetermined value as a result of the determination of the automatic stop/restart control unit 42*a* based on a residual battery capacity signal SOC, and these factors need to be met.

Here, that the brake switch is switched on means a condition where the brakes are applied. In addition, that the temperature of coolant in the engine 2 is equal to or higher than a predetermined value means that the coolant is at a temperature which enables the restart of the engine 2 for a low coolant temperature may disable the restart of the engine 2. "Other than R (reverse) or L (low)" means that the gearshift position is in any position other than R or L, for example, in the D (drive) range. That the residual battery capacity is equal to or greater than a predetermined value means that the residual capacity of the battery 18 detected by the residual battery capacity sensor 28 (refer to FIG. 2) is equal to or greater than the predetermined value, for example, equal to or greater than 25% of the capacity of the battery resulting when it is fully charged.

However, in case the following conditions are met, the automatic stop/restart control unit 42*e* does not output a stop authorization flag 1 and does not stop the engine 2. These conditions or conditions for prohibition of the stopping of the idling of the engine 2 include such factors as: the motor 3 for the motor-driven compressor 7 fails; the residual capacity of the battery 18 is less than the predetermined value; and the temperature of coolant in the engine 2 is less than the predetermined value, and the stopping of the idling of the engine 2 may be prohibited when at least one of the factors is met. Note that factors that are raised as the failure of the motor 3 include such as excessive load, excessive current and excessive voltage relative to the motor 3, decrease in voltage and welding of contacts.

In addition, the automatic stop/restart control unit 42*a* outputs a restart authorization flag F2 (refer to FIG. 2) towards the restart driving unit 42*c* at the same time that the automatic stop/restart control unit 42*a* drives the motor/generator G by a routine activated by the depression of the accelerator. Then, the restart driving unit 42*c* which has received the restart authorization flag F2 (refer to FIG. 2) implements the supply of fuel to the engine 2 and ignites the fuel so supplied, whereby the engine 2 is restarted.

The air conditioning system according to the embodiment of the invention that is constructed as is described heretofore controls such that the temperature of the passenger compartment is maintained at a predetermined temperature set by the passenger compartment temperature setting unit 16 while the engine-driven compressor 6 and the motor-driven compressor 7 help each other reduce their loads through the control of the engine-driven compressor 6 and the motor-driven compressor 7 by the controller 4.

Next, a relationship (TTEVA table) between the time during which the engine-driven compressor is switched on and the temperature in the passenger compartment will be described by reference to FIG. 3A.

Figure 3A:
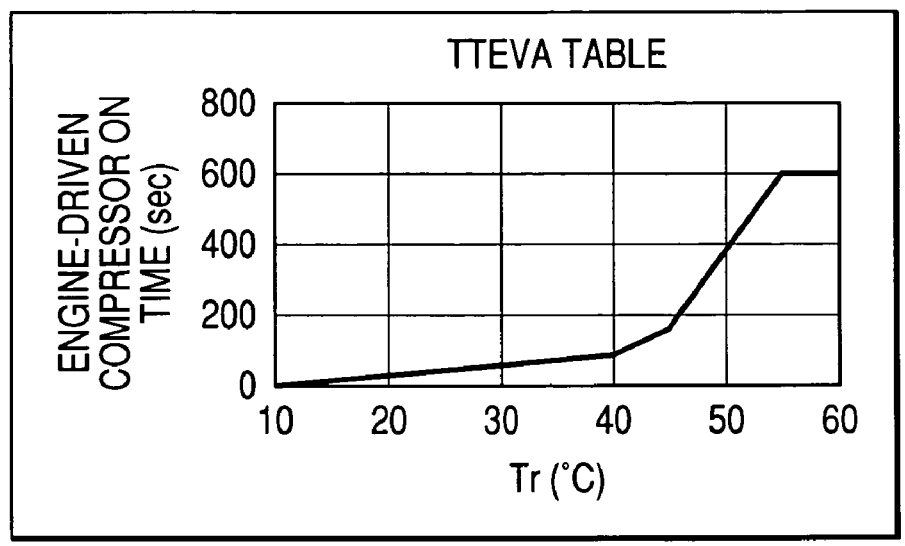
FIG. 3A is a graph showing a relationship between ON time of an engine-driven compressor and temperatures in the interior of a passenger compartment.
Figure 3B:
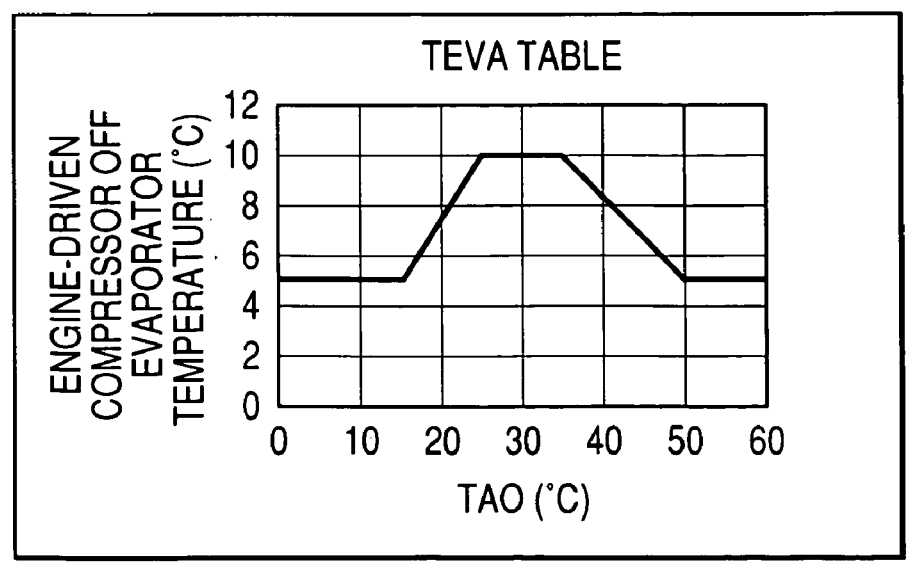
FIG. 3B is a graph showing a relationship between OFF time of the engine-driven compressor and target outlet temperatures.

FIG. 3 shows the air conditioning system according to the embodiment of the invention, in which FIG. 3A is a graph showing a relationship between the time during which the engine-driven compressor is switched on or the ON time of the engine-driven compressor and the temperature in the passenger compartment, and FIG. 3B is a graph showing a relationship between the time during which the engine-driven compressor is switched off or the OFF time of the engine-driven compressor and a target outlet temperature.

In FIG. 3A, the ON time (TTEVA) of the engine-driven compressor 6 is controlled by the compressor control unit 41*a* so as to be zero when the temperature of the passenger compartment (Tr) is 10° C., is controlled so as to be about 80 seconds when the temperature of the passenger compartment (Tr) is 40° C., is controlled so as to be about 400 seconds when the temperature of the passenger compartment (Tr) is 50° C., and is controlled so as to be about 600 seconds when the temperature of the passenger compartment is 55° C. or higher, respectively. The ON time (TTEVA) rises substantially proportionally when the temperature of the passenger compartment (Tr) ranges 10 to 40° C. Thus, the ON time (TTEVA) of the engine-driven compressor 6 becomes longer as the temperature of the passenger compartment (Tr) increases for it takes time to set the temperature of the passenger compartment to a comfortable temperature.

Next, a relationship (TEVA table) between an evaporator temperature and a target outlet temperature when the engine-driven compressor is switched off will be described by reference to FIG. 3B.

In FIG. 3B, an evaporator temperature (TEVA) when the engine-driven compressor 6 shown in FIG. 1 is switched off is controlled by the evaporator control unit 41*e* so as to be about 5° C. when a target outlet temperature (TAO) ranges from 0 to about 15° C., is controlled so as to be increased to about 5° C. to 10° C. when the target outlet temperature (TAO) ranges from about 15° C. to about 25° C., is controlled so as to become about 10° C. when the target outlet temperature (TAO) ranges from about 25° C. to about 35° C., is controlled so as to be decreased to about 10° C. to 5° C. when the target outlet temperature (TAO) ranges from about 35° C. to about 50° C., and is controlled so as to be about 5° C. when the target outlet temperature (TAO) is 50° C. or higher, respectively. Thus, the evaporator temperature (TEVA) when the engine-driven compressor 6 is switched off is controlled so as to be 5 to 10° C.

Next, a relationship (TGTAC table) between a target evaporator temperature by the motor-driven compressor and a target outlet temperature will be described with reference to FIG. 5A.

Figure 5A:
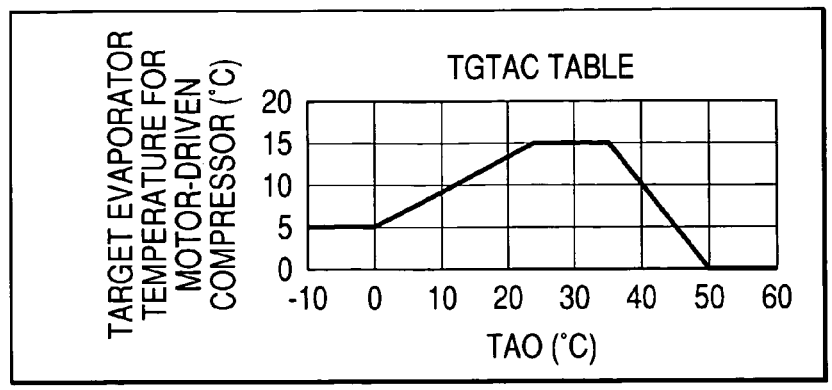
FIG. 5A is a graph showing a relationship between a target evaporator temperature by the mode-driven compressor and a target outlet temperature.
Figure 5B:
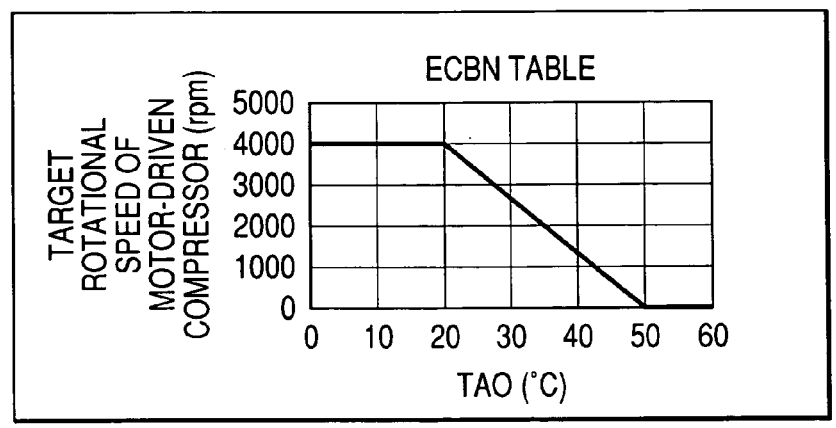
FIG. 5B is a graph showing a relationship between a target rotational speed of the motor-driven compressor and a target outlet temperature.
Figure 5C:
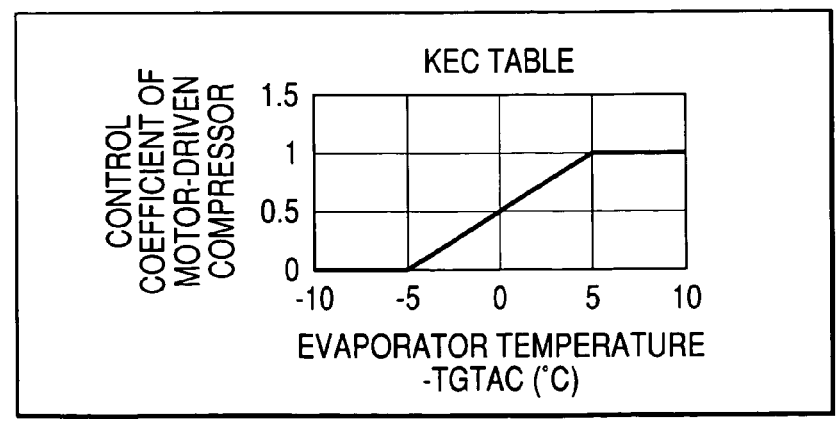
FIG. 5C is a graph showing a relationship between a control coefficient by the motor-driven compressor and evaporator temperature-target evaporator temperature.

FIG. 5 shows the air conditioning system according to the embodiment of the invention, in which FIG. 5A is a graph showing a relationship between a target evaporator temperature by the mode-driven compressor and a target outlet temperature, FIG. 5B is a graph showing a relationship between a target rotational speed of the motor-driven compressor and a target outlet temperature, and FIG. 5C is a graph showing a relationship between a control coefficient by the motor-driven compressor and evaporator temperature-target evaporator temperature.

In FIG. 5A, a target evaporator temperature (TGTAC) by the motor-driven compressor shown in FIG. 1 is controlled by the evaporator control unit 41*e* so as to be about 5° C. when a target outlet temperature (TAO) ranges from −10° C. to about 0° C., is controlled so as to be increased to about 5° C. to 15° C. when the target outlet temperature (TAO) ranges from about 0° C. to about 25° C., is controlled so as to become about 15° C. when the target outlet temperature (TAO) ranges from about 25° C. to about 35° C., is controlled so as to be decreased to about 15° C. to 0° C. when the target outlet temperature (TAO) ranges from about 35° C. to about 50° C., and is controlled so as to be about 0° C. when the target outlet temperature (TAO) is 50° C. or higher, respectively. Thus, the target evaporator temperature (TGTAC) by the motor-driven compressor 7 is controlled so as to be 5° C. to 15° C. by the target outlet temperature (TAO). The target evaporator temperature (TGTAC) is controlled so as to be a temperature lower than the target outlet temperature (TAO) to thereby cool the interior of the passenger compartment when the target outlet temperature (TAO) exceeds about 10° C.

Next, the operation of the air conditioning system 1 according to the embodiment will be described by reference to a flowchart shown in FIG. 4.

Figure 4:
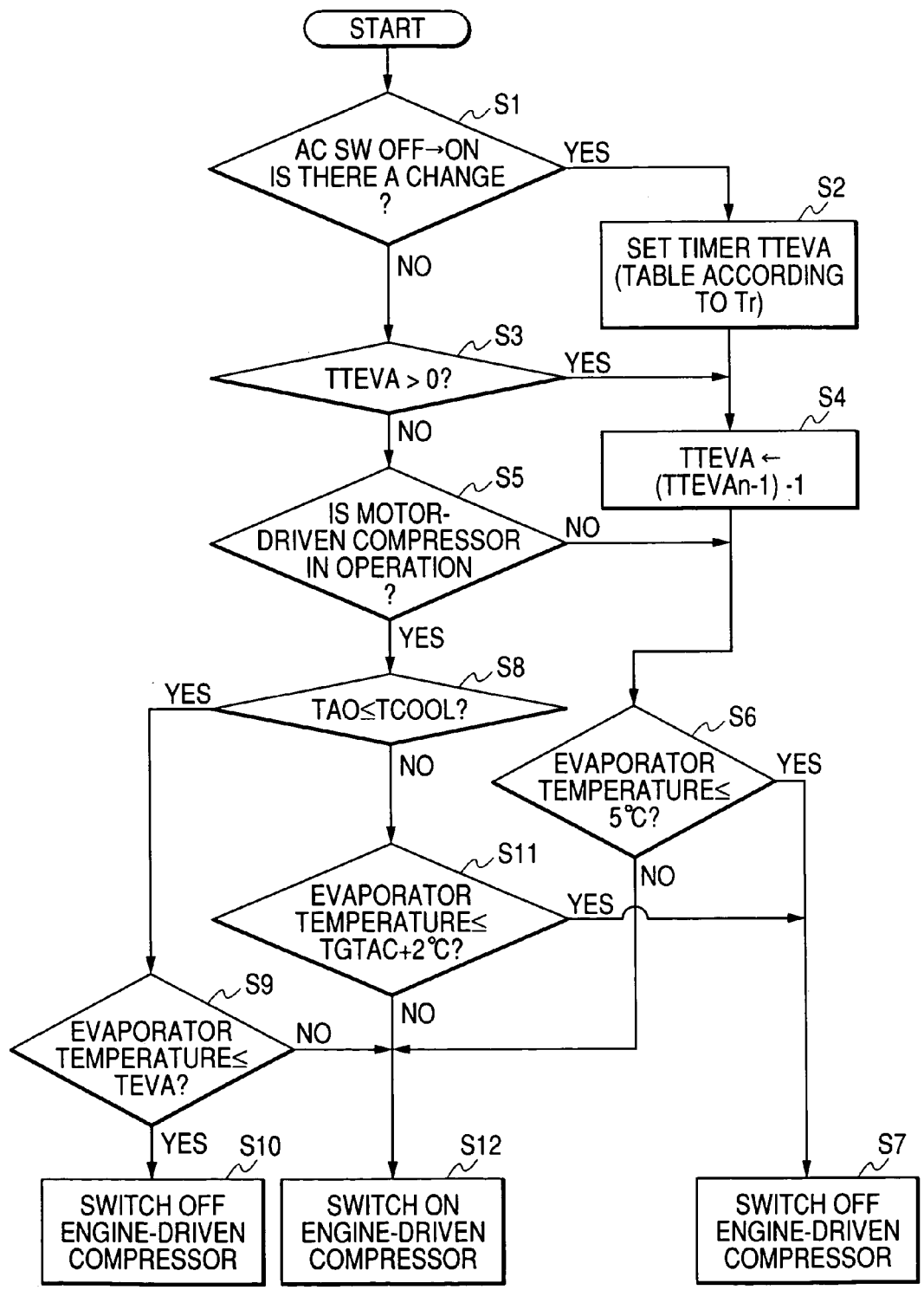
FIG. 4 is a drawing showing the air conditioning system according to the embodiment of the invention, and a flowchart of an authorization control when the engine-driven compressor is automatically stopped.

FIG. 4 is a drawing illustrating the air conditioning system according to the embodiment of the invention and is a flowchart of authorization control implemented when automatically stopping the engine-driven compressor.

First of all, referring to the respective drawings as well as FIG. 4 mainly, an authorization control implemented when the engine-driven compressor 6 is automatically stopped will be described.

First of all, as shown in FIG. 1, the ignition switch 19 is operated to be turned so as to start the engine 2. Then, the respective sensors provided on the engine and respective devices are switched on and the sensors start reading of information automatically.

Then, in FIG. 4, whether or not the air conditioner switch 15 shown in FIG. 1 is switched from OFF to ON is determined in step S1.

If the air conditioner switch 15 is switched ON (YES), the engine-driven compressor 6 and the motor-driven compressor 7 of the hybrid-type compressor 5 operate, and the flow proceeds to step S2 where the timer 41b for activating the engine-driven compressor 6 which functions as the main compressor of the hybrid-type compressor 5 is set to the ON time (TTEVA). As shown in FIG. 3A, this ON time (TTEVA) changes as the passenger compartment temperature (Tr) changes. The engine-driven compressor 6 operates only for the ON time (TTEVA) shown in the TTEVA table as time needed by the engine-driven compressor 6 to make the current passenger compartment temperatures (Tr) shown in FIG. 3A a comfortable temperature (step S4).

Note that the elapse of the ON time (TTEVA) when the timer operates corresponds to an "elapse of a predetermined time" claimed herein.

In addition, after the air conditioner switch 15 is switched on, the timer 41b operates for the predetermined length of time (the ON time (TTEVA)), and in the hybrid-type compressor 5, the two compressors, that is, the engine-driven compressor 6 which functions as the main compressor and the motor-driven compressor 7 compress and pressurize the refrigerant, whereby the refrigeration cycle apparatus A is activated, and the evaporator 12 and the interior of the passenger compartment are cooled.

On the other hand, if the air conditioner switch remains switched off (NO), the flow proceeds to step S3.

In step S3, whether or not the ON time (TTEVA) of the engine-driven compressor 6 is larger than 0 is determined.

Then, if TTEVA>0 is true (YES), in other words, if the engine-driven compressor 6 is in the midst of operation for the ON time (TTEVA), the engine-driven compressor 6 is allowed to operate only for this ON time (TTEVA) (step 4).

On the other hand, if TTEVA>0 is not true (NO), in other words, the ON time of the engine-driven compressor 6 is 0, and the engine-driven compressor 6 is stopped, the flow proceeds to step S5.

In step S5, whether or not the motor-driven compressor 7 is stopped is monitored and is then determined.

If the motor-driven compressor is not in operation (NO), that is, if the motor-driven compressor 7 is at halt, the flow proceeds to step S6.

On the other hand, if the motor-driven compressor 7 is in operation (YES), the flow proceeds to step S8.

In step S6, whether or not the evaporator temperature (EVA) on the outlet side of the evaporator 12 is equal to or lower than 5° C. is determined.

Then, if the evaporator temperature≦5° C. (YES), that is, if the evaporator temperature (EVA) is equal to or lower than 5° C., it is understood that a comfortable temperature is being realized in the interior of the passenger compartment, and the flow proceeds to step S7, where the engine-driven compressor 6 is switched off.

On the contrary, if the evaporator temperature≦5° C. is not true (NO), that is, the evaporator temperature (EVA) exceeds 5° C., it is understood that the temperature in the passenger compartment is high and no comfortable temperature is not being realized in the interior of the passenger compartment, and the flow proceeds to step S12, where the engine-driven compressor 6 is switched on so as to realize a comfortable temperature in the interior of the passenger compartment.

In step S8, whether or not the target outlet temperature (TAO) is equal to or lower than a required cooling temperature (TCOOL) is determined by comparing the target outlet temperature (TAO) calculated by the target temperature calculating unit 41c with the required cooling temperature of the passenger compartment.

Then, if TAO≦TCOOL (YES), that is, if the target outlet temperature (TAO) is equal to or lower than the required cooling temperature (TCOOL), the flow proceeds to step S9.

On the contrary, if TAO≦TCOOL is not true (NO), that is, if the target outlet temperature (TAO) exceeds the required cooling temperature (TCOOL), the flow proceeds to step S11.

In step S9, whether or not the current evaporator temperature (EVA) is equal to or lower than the evaporator temperature (TEVA) resulting when the engine-driven compressor 6 is stopped is determined by comparing the current evaporator temperature (EVA) with the evaporator temperature (TEVA) resulting when the engine-driven compressor 6 is stopped relative to the target outlet temperature (TAO) shown in FIG. 3B.

If the evaporator temperature≦TEVA (YES), that is, if the current temperature (EVA) is equal to or lower than the evaporator temperature (TEVA) resulting when the engine-driven compressor 6 is stopped, it is understood that the temperature of the evaporator 12 is sufficiently lowered, and the flow proceeds to step S10 where the engine-driven compressor 6 is switched off. In the hybrid-type compressor 5, only the motor-driven compressor 7 is allowed to operate and is then controlled by the evaporator control unit 41e such that the evaporator temperature (EVA) is converged to the target evaporator temperature (TGTAC).

On the other hand, the evaporator temperature≦TEVA is not true (NO), that is, if the current temperature (EVA) exceeds the evaporator temperature (TEVA) resulting when the engine-driven compressor 6 is stopped, it is understood that the temperature of the evaporator 12 is not sufficiently lowered, and the flow proceeds to step S12 where the engine-driven compressor 6 is switched on and is controlled by the evaporator control unit 41e such that the temperature of the evaporator 12 becomes the target evaporator temperature (TGTAC).

In step S11, whether or not the target outlet temperature (TAO) is equal to or lower than a temperature that is higher by 2° C. than the target evaporator temperature (TGTAC) is determined by comparing the evaporator temperature (EVA) with the temperature that is higher by 2° C. than the target evaporator temperature (TGTAC) of the motor-driven compressor 7 relative to the target outlet temperature (TAO) shown in FIG. 5A.

Then, if the evaporator temperature≦TGTAC+2° C. (YES), that is, if the evaporator temperature (EVA) is equal to or lower than TGTAC+2° C., it is understood that the evaporator 12 is sufficiently cooled, and the flow proceeds to step S7, where the engine-driven compressor 6 is switched off.

On the contrary, if the evaporator temperature≦TGTAC+2° C. is not true (NO), that is, if the evaporator temperature (EVA) exceeds TGTAC+2° C., it is understood that the temperature on the outlet side of the evaporator 12 is not sufficiently low, and the flow proceeds to step S12, where the engine-driven compressor 6 is switched on, whereby the temperature on the outlet side of the evaporator 12 is gradually lowered by the action of the engine-driven compressor 6 so switched on to operate.

Besides, a hysteresis 2° is set in order to stably control.

Thus, with the air conditioning system 1, the evaporator 12 and the interior of the passenger compartment can be cooled quickly by allowing the timer 41b to operate for the predetermined length of time (the ON time (TTEVA)) after the air conditioner switch 15 is switched on, so that the refrigerant is compressed and pressurized by the two compressors such as the engine-driven compressor 6 which functions as the main compressor and the motor-driven compressor 7.

In addition, The switching on and off of the motor-driven compressor 7 is determined by the target evaporator temperatures (TGTAC) table of the motor-driven compressor 7 when the required cooling temperature (TCOOL) is lower than the target outlet temperature (TAO) (TAO>TCOOL).

Then, the evaporator temperature (EVA) is controlled by the motor-driven compressor 7 so as to be converged to the target evaporator temperature (TGTAC), whereby the interior of the passenger compartment is maintained to a comfortable temperature.

Next, a relationship (ECBN table) between the target rotational speed of the motor-driven compressor and the target outlet temperature will be described by reference to FIG. 5B.

As shown in FIG. 5B, the target rotational speed rpm of the motor-driven compressor 7 is controlled by the compressor control unit 41a so as to be 4000 rpm when the target outlet temperature (TAO) ranges from about 0° C. to about 20° C., is controlled a so as to be lowered to 4000 rpm to 0 rpm when the target outlet temperature (TAO) ranges from about 20° C. to about 50° C., and is controlled such that the motor-driven compressor 7 is stopped when the target outlet temperature (TAO) exceeds 50° C., respectively. Thus, the target rotational speed rpm of the motor-driven compressor 7 is controlled by the compressor control unit 41a so as to be 4000 rpm when the target outlet temperature is equal to or lower than about 20° C., whereas the target rotational speed of the motor-compressor 7 is controlled so as to be a slower rotational speed inversely proportionally when the target outlet temperature (TAO) exceeds about 20° C., respectively.

Next, a relationship (KEC table) between a control coefficient of the motor-driven compressor 6 and evaporator temperature-target evaporator temperature will be described by reference to FIG. 5C.

As shown in FIG. 5C, the control coefficient (KEC) of the motor-driven compressor 7 becomes 0 when the evaporator temperature (EVA)-target evaporator temperature (TGTAC) ranges from −10° C. to −5° C., increases to 0 to 1 when the evaporator temperature (EVA)-target evaporator temperature (TGTAC) ranges from −5° C. to 5° C., and becomes 1 when the evaporator temperature (EVA)-target evaporator temperature (TGTAC) ranges from 5° C. to 10° C. Thus, the control coefficient (KEC) of the motor-driven compressor 7 is made to become 0 to 1 by the evaporator temperature (EVA)-target evaporator temperature (TGTAC).

Figure 6:
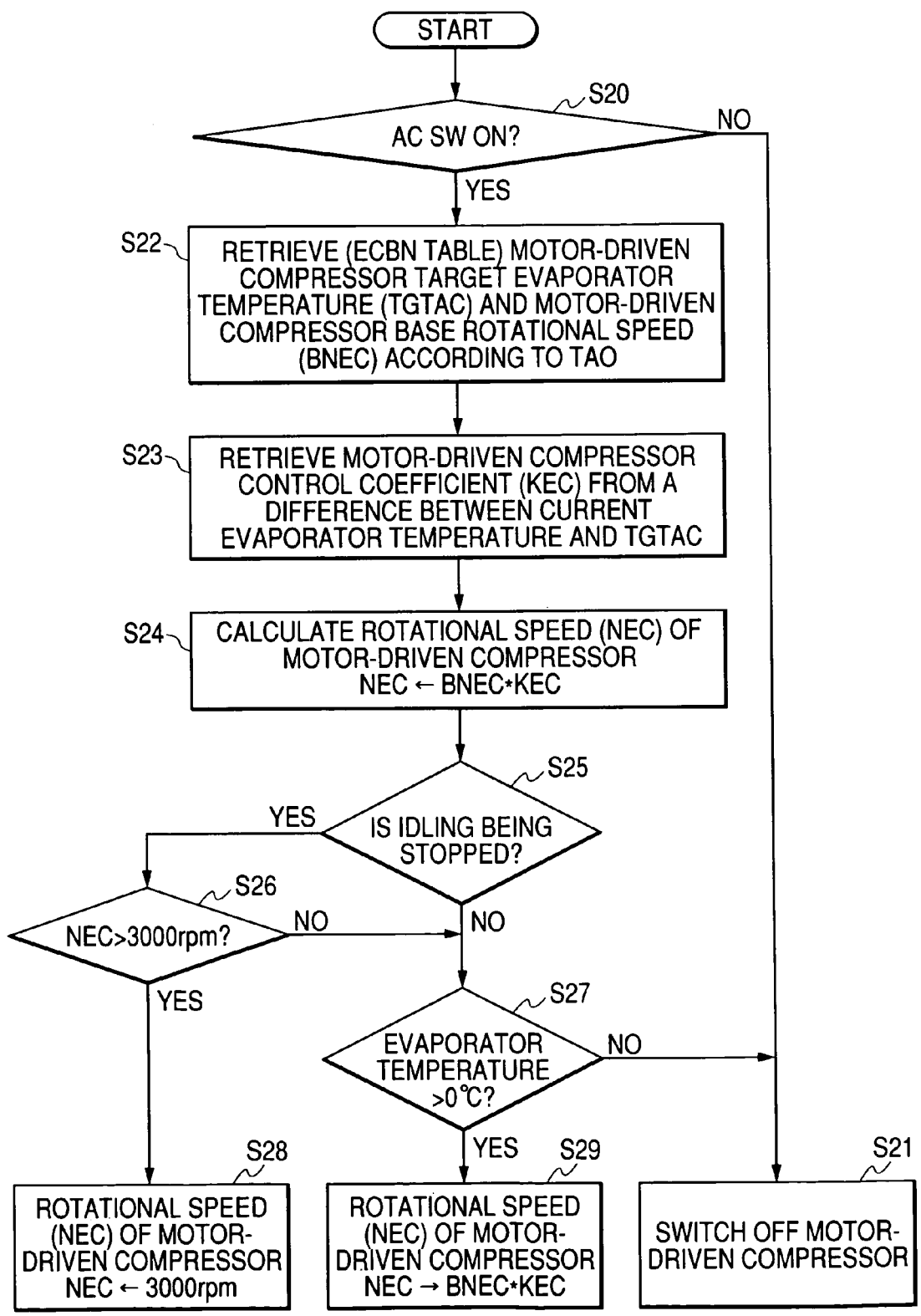
FIG. 6 is a drawing showing the air conditioning system according to the embodiment of the invention, and a flowchart of control of the motor-driven compressor.

FIG. 6 is a drawing showing the air conditioning system according to the embodiment of the invention, and a flowchart of control of the motor-driven compressor.

Next, control of a motor-driven compressor 7 will be described with reference to each figures, mainly FIG. 6.

First of all, in FIG. 6, whether or not the air conditioner switch 15 shown in FIG. 1 is monitored and determined in step S20.

If "AC SW ON" is not true (NO), that is, when the air conditioner switch 15 is off, the flow proceeds to step S21, where the motor-driven compressor 7 is off.

On the other hand, if "AC SW ON" is true (YES), that is, when the air conditioner switch 15 is switched on, the flow proceeds to step S22.

In step S22, a target evaporator temperature (TGTAC) for the motor-driven compressor 7 that corresponds to a target outlet temperature (TAO) and a base rotational speed (BNEC) for the motor-driven compressor 7 are retrieved from the EBC table shown in FIG. 5B, and the flow proceeds to step S23.

In step S23, the control coefficient (KEC) of the motor-driven compressor 7 is retrieved from a difference between the current evaporator temperature (EVA) and the target evaporator temperature (TGTAC), and the flow proceeds to step S24.

In step S24, a rotational speed (NEC) of the motor-driven compressor 7 is calculated, and the flow proceeds to step S25. This rotational speed (NEC) of the motor-driven compressor 7 is a numerical value obtained by multiplying the base rotational speed (BNEC) of the motor-driven compressor 7 by the control coefficient (KEC) of the motor-driven compressor 7.

In step S25, whether or not the idling of the engine 2 (refer to FIG. 1) is being stopped is determined by the vehicle speed sensor 22, the accelerator opening detection sensor 23 and the Ne sensor 24.

If the idling is being stopped (YES), that is, if the motor-driven compressor 7 is being operated while the engine 2 (refer to FIG. 1) and the engine-driven compressor 6 are being stopped, the flow then proceeds to step S26.

On the other hand, if the idling is not being stopped (NO), that is, if the engine 2 (refer to FIG. 1) is in operation, the flow proceeds to step S27.

In step 26, whether or not the rotational speed of the motor-driven compressor 7 exceeds 3000 rpm is monitored and determined.

If NEC>3000 rpm is true (YES), that is, if the rotational speed (NEC) of the motor-driven compressor 7 exceeds 3000 rpm, it is understood that an excessive load is being applied to the motor-driven compressor 7, and the flow proceeds to step S28, where the rotational speed (NEC) is made to be 3000 rpm.

On the contrary, if NEC>3000 rpm is not true (NO), that is, the rotational speed (NEC) of the motor-driven compressor 7 is 3000 rpm or lower, the flow proceeds to step S27.

In step S27, whether or not the evaporator temperature (EVA) exceeds is monitored and determined.

If the evaporator temperature>0° C. is true (YES), that is, if the evaporator temperature (EVA) exceeds 0° C., the flow proceeds to step S29, and the rotational speed (NEC) of the motor-driven compressor 7 is made to be a numerical value obtained by multiplying the base rotational speed (BNEC) by the control coefficient (KEC) of the motor-driven compressor 7. As shown in FIG. 5C, since the control coefficient (KEC) of the motor-driven compressor 7 is 0 to 1, the rotational speed (NEC) of the motor-driven compressor 7 is controlled by the air conditioning control unit 41 so as to be slower than the base rotational speed (BNEC), so that the evaporator temperature (EVA) is converged to the target evaporator temperature (TGTAC).

On the contrary, if the evaporator temperature>0° C. is not true (NO), that is, if the evaporator temperature (EVA) is 0°

C. or lower, it is understood that the temperature on the outlet side of the evaporator 12 is sufficient low, the flow proceeds to step S21, and the motor-driven compressor 7 is switched off.

Thus, while the idling of the engine 2 is being stopped, the air conditioning system 1 can maintain the temperature in the interior of the passenger compartment to a comfortable level by switching on and off the motor-driven compressor 7 based on the target evaporator temperatures (the TGTAC table) of the motor-driven compressor 7 relative to the target outlet temperatures (TAO) shown in FIG. 5A so as to allow the evaporative temperature (EVA) to be converged to the target evaporative temperature.

Then, when the load of the motor-driven compressor 7 is increased, the load of the motor-driven compressor 7 is decreased by making the rotational speed of the motor-driven compressor 7 become 3000 rpm, so that the cooling capability of the air conditioning system 1 is lowered, thereby making it possible to maintain the temperature in the interior of the passenger compartment to a comfortable level at all times.

Note that the invention is not limited to the embodiment that is described heretofore but may be modified or altered in various ways without departing from the scope of the technical concept of the invention, and needless to say, the invention is to cover all the modifications or alterations so made.

For example, the air conditioning system 1 can be applied to vehicles having no function to stop temporarily the idling of the engines thereof, provided that there are provided thereon the engine-driven compressor (the primary compressor) 6 that is driven by the engine (the primary driving source) 2 and the motor-driven compressor (the secondary compressor) 7 that is driven by the motor (the secondary driving source) 3. With the air conditioning system 1 provided on such vehicles, the motor-driven compressor (the secondary compressor) 7 is caused to operate before the engine-driven compressor (the primary compressor) 6 is stopped so as to increase the cooling capability of the air conditioning system 1. In addition, when the rotational speed of the motor-driven compressor (the secondary compressor) 7 increases, the engine (the primary driving source) 2 is started so as to cause the two compressors 6, 7 to operate together suitably, whereby not only can the temperature in the interior of the passenger compartment be maintained to a comfortable level but also the improvement in fuel economy can be attained while making exhaust emissions cleaner. In addition, with the air conditioning system 1, the two compressors 6, 7 are made to cooperate with each other so as to decrease the loads thereof, whereby the decrease in the cooling capability of the air conditioning system 1 can be prevented, and hence the temperature in the interior of the passenger compartment can be maintained at a comfortable level.

As is described heretofore, according to the first aspect of the invention, since the air conditioning system changes over the two compressors to make them play a role as a main compressor by making the compressors operate simultaneously or independently according to the required cooling capability, not only can the efficiency of the compressor be increased but also contradicting requirements of increasing the cooling capability of the air conditioning system and improving the fuel economy of the engine can be satisfied simultaneously.

Due to this, for example, even when the primary compressor (the engine-driven compressor) is stopped as a result of stopping the idling of the primary driving source (the engine), the decrease in the cooling capability of the air conditioning system can be prevented by the action of the secondary compressor (the motor-driven compressor) only to thereby prevent an increase in temperature inside the passenger compartment. By this construction, the air conditioning system can maintain the temperature of cooled air thereof that is discharged into the passenger compartment to thereby maintain the inside of the passenger compartment at a comfortable temperature.

According to the second aspect of the invention, when stopping, for example, the primary compressor (the engine-driven compressor), the air conditioning system causes the timer to stop the primary compressor (the engine-driven compressor) the predetermined length of time after the stopping signal is received, whereby the primary compressor (the engine-driven compressor) can be stopped after an extra cooling capability is imparted to the air conditioning system. By this construction, for example, even when the primary compressor (the engine-driven compressor) is stopped as a result of stopping the idling, the air conditioning system can maintain the temperature in the interior of the passenger compartment to a comfortable level in the event that the air conditioning system is run by the secondary compressor (the motor-driven compressor) only.

What is claimed is:

1. An air conditioning system for a vehicle comprising:
    a primary compressor driven by a primary driving source, and
    a secondary compressor driven by a secondary driving source, wherein
    when a required cooling capability is equal to or greater than a predetermined value, the air conditioning system causes the primary compressor to be driven by the primary driving source and adjusts the rotational speed of the secondary compressor, and
    when the required cooling capability is equal to or smaller than the predetermined value, the air conditioning system causes the secondary compressor to be driven by the secondary drive source so as to control the rotational speed of the primary compressor.

2. The air conditioning system as set forth in claim 1, wherein
    when stopping the primary compressor, the air conditioning system causes a timer to stop the primary compressor a predetermined length of time after a stopping signal is received.

* * * * *